US005647387A

United States Patent [19]

Tsutsui

[11] Patent Number: 5,647,387

[45] Date of Patent: Jul. 15, 1997

[54] APPARATUS AND METHOD FOR CONTROLLING DUTY SOLENOID VALVES

[75] Inventor: Teiji Tsutsui, Hyogo, Japan

[73] Assignee: Mitsubishi Denki Kabushiki Kaisha, Tokyo, Japan

[21] Appl. No.: 491,594

[22] Filed: Jun. 16, 1995

[30] Foreign Application Priority Data

Dec. 13, 1994 [JP] Japan .................................... 6-308800

[51] Int. Cl.$^6$ ............................ F16K 31/06; H01H 47/04

[52] U.S. Cl. .......................... 137/1; 251/129.05; 361/154

[58] Field of Search ......................... 251/129.05, 129.01; 137/1; 361/154, 152

[56] References Cited

U.S. PATENT DOCUMENTS 5,202,813 4/1993 Uota et al. ...................... 251/120.05 X
5,508,906 4/1996 Nelli et al. ........................... 361/154 X
5,574,617 11/1996 Shimanuki et al. .................... 361/154

FOREIGN PATENT DOCUMENTS 3-216713 9/1991 Japan .

*Primary Examiner*—Kevin Lee
*Attorney, Agent, or Firm*—Sughrue, Mion, Zinn, Macpeak & Seas

[57] ABSTRACT

A duty solenoid valve control apparatus and a duty solenoid valve control method, in which a plurality of duty solenoid valves different in operation from each other are controlled without increase of the program capacity of a computer. The apparatus comprises a duty signal generating device for generating a duty signal corresponding to a time ratio, an overexcitation signal generating device for generating an overexcitation signal to overexcite a solenoid coil, a holding signal generating device for generating a holding signal to hold a duty solenoid valve, and a signal synthesizing device for synthesizing the duty signal, the overexcitation signal and the holding signal into a drive signal for driving the solenoid coil.

4 Claims, 9 Drawing Sheets

APPARATUS AND METHOD FOR CONTROLLING DUTY SOLENOID VALVES

BACKGROUND OF THE INVENTION

1. Field of the Invention

The present invention relates to an apparatus and a method for controlling duty solenoid valves each of which controls the pressure or flow rate of a fluid.

2. Description of the Related Art

Conventionally, it is known a duty solenoid valve control apparatus described in Unexamined Japanese Patent Publication (Kokai) Hei-3-216713.

In the apparatus described in JP-A-3-216713, overexcitation control is performed so that a current rises rapidly in a solenoid coil when the solenoid coil is conducted to thereby open a duty solenoid valve rapidly, and holding control is performed after the overexcitation control so that the duty solenoid valve is held in an opened state with the current at an irreducible minimum value. FIGS. 9A to 9D are time charts showing this condition. In FIG. 9A, a duty signal has a pulse duration Tx in each pulse repetition period To so that the duty signal becomes high (H) in level in the pulse duration Tx. In this pulse duration Tx, a micro computer outputs an overexcitation signal having a predetermined pulse width in a period Tc, and in a remainder period of (Tx–Tc), the micro computer outputs a holding signal composed of chopping pulses. In this manner, the overexcitation signal and the holding signal constitute a pulse width modulation (PWM) signal as shown in FIG. 9B. The voltage and current in the solenoid coil in this condition have waveforms as shown respectively in the FIGS. 9C and 9D.

More specifically, the micro computer generates such a PWM signal as shown in FIG. 9B on the basis of the flow chart of FIG. 10 as follows. The micro computer executes an interruption process simultaneously with the rising of the duty signal to thereby output an overexcitation signal and then executes an interruption process again to thereby output a holding signal at the timing when the overexcitation control is to be switched over to the holding control. When the duty signal falls down, the micro computer executes an interruption process again to thereby cut off the signal supply to the duty solenoid valve.

Because the duty solenoid valve control apparatus described in JP-A-3-216713 operates as described above, an interruption process (FIG. 10) is required whenever any one of overexcitation control, holding control and cutting-off of a signal supplied to the duty solenoid valve is carried out.

Further, the signal supplied to the solenoid coil as shown in FIG. 9B is given to one duty solenoid valve or a plurality of duty solenoid valves of the identical operation.

Accordingly, if a plurality of duty solenoid valves different in operation from each other are to be controlled, the same number of interruption processes as the number of duty solenoid valves are required. Therefore, the program capacity must be large. Further, because the number of interruption processes increases, processing cannot be made at a high speed. There arises a problem that the duty solenoid valves cannot be driven at a high speed.

Further, if the number of duty solenoid valves increases, there arises a problem that the control apparatus becomes complex.

SUMMARY OF THE INVENTION

An object of the present invention is to solve the aforementioned problems. Particularly, it is an other object of the present invention to provide a duty solenoid valve control apparatus in which controlling of a plurality of duty solenoid valves different in operation from each other is achieved at the minimum program capacity of a computer.

It is a further object of the present invention to provide a duty solenoid valve control apparatus in which controlling of a plurality of duty solenoid valves different in operation from each other is achieved by a simple structure.

It is a still further object of the present invention to provide a duty solenoid valve control apparatus in which a plurality of duty solenoid valves different in operation from each other are operated at a high speed.

It is a further object of the present invention to provide a duty solenoid valve control method in which controlling of a plurality of duty solenoid valves different in operation from each other is achieved at the minimum program capacity of a computer.

In order to achieve the above objects, according to an aspect of the present invention, the duty solenoid valve control apparatus comprises: at least one duty solenoid valve for controlling a pressure or flow rate of a fluid on the basis of a time ratio of a current conduction time of a solenoid coil to a current not-conduction time of the solenoid coil; a computer for controlling the duty solenoid valve; at least one driving means responsive to signals supplied from the computer for driving the solenoid coil; the computer including a duty signal generating means for generating a duty signal corresponding to the time ratio, an overexcitation signal generating means for generating an overexcitation signal to overexcite the solenoid coil, and a holding signal generating means for generating a holding signal to hold the duty solenoid valve; and the driving means including a signal synthesizing means for synthesizing a drive signal for driving the solenoid coil on the basis of the duty signal, the overexcitation signal and the holding signal.

In the duty solenoid valve control apparatus according to the present invention, a signal is synthesized from the duty signal, the overexcitation signal and the holding signal given by the computer, so that the duty solenoid valve is driven on the basis of the synthesized signal.

In the above duty solenoid valve control apparatus, preferably, the apparatus comprises a plurality of duty solenoid valves, and a plurality of driving means, and the computer supplies the plurality of driving means with a single holding signal commonly for holding the plurality of duty solenoid valves. Therefore, a plurality of duty solenoid valves are held on the basis of a single holding signal.

In the above duty solenoid valve control apparatus, the signal synthesizing means has a logical sum calculating means for calculating the logical sum of the overexcitation signal and the holding signal, and a logical product calculating means for calculating the logical product of the logical sum and the duty signal. The logical sum of the overexcitation signal and the holding signal and the logical product of the logical sum and the duty signal are calculated to thereby synthesize a drive signal.

According to another aspect of the present invention, a duty solenoid valve control method comprising the steps of: generating a duty signal corresponding to the time ratio; generating an overexcitation signal to overexcite the solenoid coil; generating a holding signal to hold the duty solenoid valve; synthesizing the duty signal, the overexcitation signal and the holding signal into a drive signal for driving the solenoid coil; and driving the solenoid coil on the basis of the drive signal.

According to the duty solenoid valve control method of the present invention, a duty signal corresponding to a time ratio is generated, an overexcitation signal is generated to overexcite a solenoid coil, a holding signal is generated to hold a duty solenoid valve, and a drive signal for driving the solenoid coil is synthesized on the basis of the duty signal, the overexcitation signal and the holding signal, so that the solenoid coil is driven on the basis of the drive signal.

DESCRIPTION OF THE PREFERRED EMBODIMENTS

Figure 1:
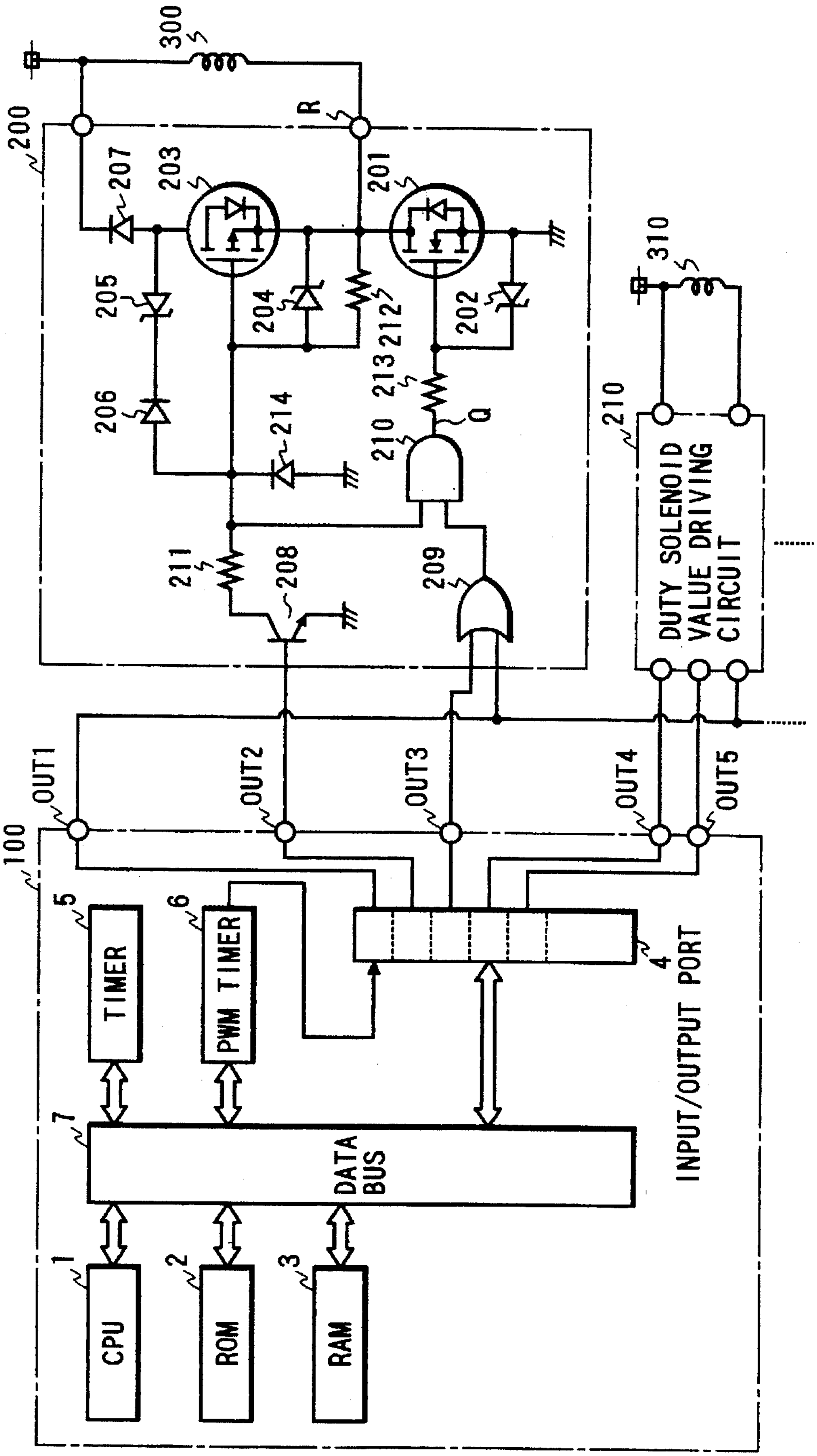
FIG. 1 is a block diagram showing the configuration of an apparatus according to the present invention.

FIG. 1 shows the configuration of the present invention. In the drawing, the reference numeral 100 designates a micro computer having at least three output terminals. In this embodiment, the micro computer 100 has five output terminals OUT1 to OUT5. The micro computer 100 further includes a central processing unit (CPU) 1 for executing a program, a read-only memory (ROM) 2 for storing programs and data, a random access memory (RAM) 3 for storing data processed in accordance with a program, an input-output port 4 for exchanging signals between the micro computer and an external device, a timer 5 for performing time measurement, pulse signal generation, or the like, a PWM timer 6 connected to the input-output port 4, and a data bus 7 for connecting the CPU 1, the ROM 2, the RAM 3, the input-output port 4, the timer 5 and the PWM timer 6. Further, the input-output port 4 transmits a signal to the outside of the micro computer 100 through the output terminals OUT1 to OUT5.

The reference numeral 200 designates a duty solenoid driving circuit which is means for driving a duty solenoid valve. The duty solenoid driving circuit 200 controls current conduction of a solenoid coil 300 of the duty solenoid valve on the basis of signals supplied through the output terminals OUT1 to OUT3 of the micro computer 100.

The reference numeral 210 designates another duty solenoid valve driving circuit which is means for driving another duty solenoid valve. The duty solenoid driving circuit 210 controls current conduction of a solenoid coil 310 of the other duty solenoid valve on the basis of signals supplied through the output terminals OUT1, OUT4 and OUT5 of the micro computer 100.

Signals outputted from the output terminals OUT of the micro computer 100 will be described below. FIGS. 2A to 2F are time charts showing signals at respective portions in FIG. 1.

Figure 2A:
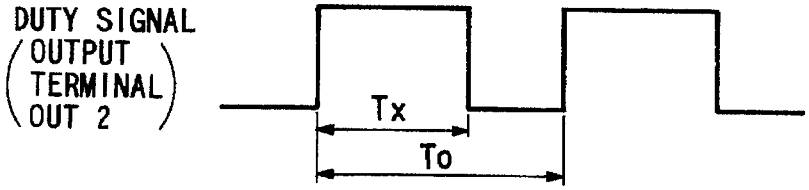
FIGS. 2A through 2F are a time chart showing the operation of the apparatus according to the present invention.
Figure 2B:
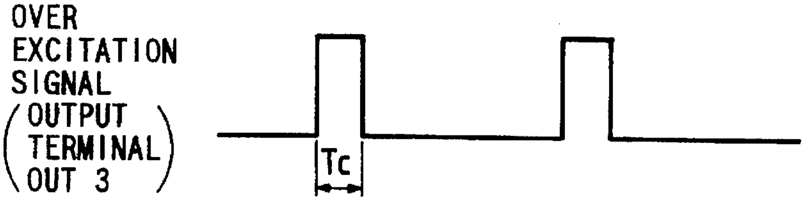

FIG. 2A shows the waveform of a duty signal outputted from the output terminal OUT2. FIG. 2B shows the waveform of an overexcitation signal outputted from the output terminal OUT3. The duty signal and the overexcitation signal are generated by the timer 5. Incidentally, the timer 5 includes a duty signal generating means and an overexcitation signal generating means.

Figure 3:
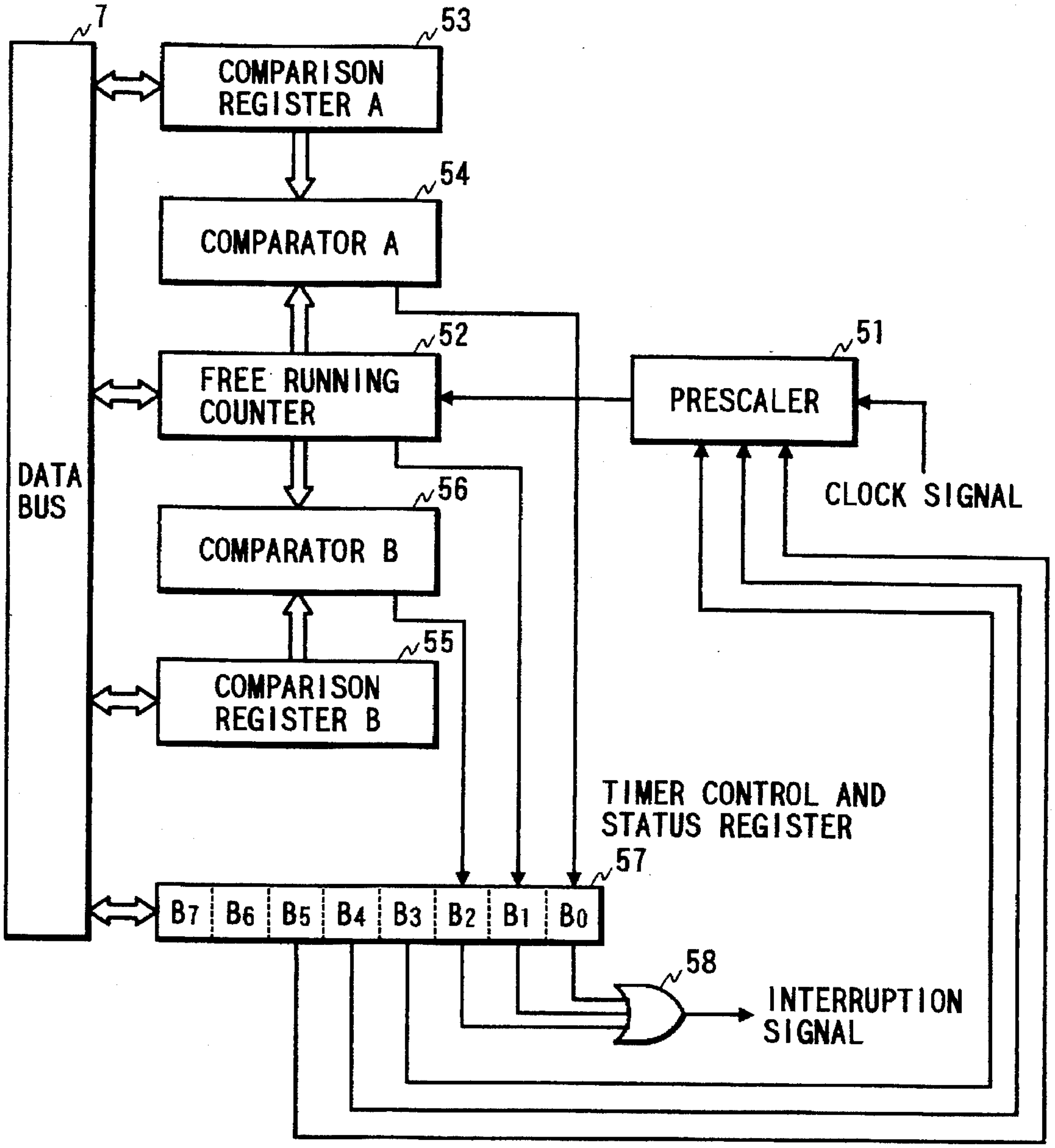
FIG. 3 is a detailed block diagram of the timer in the apparatus depicted in FIG. 1.
Figure 4:
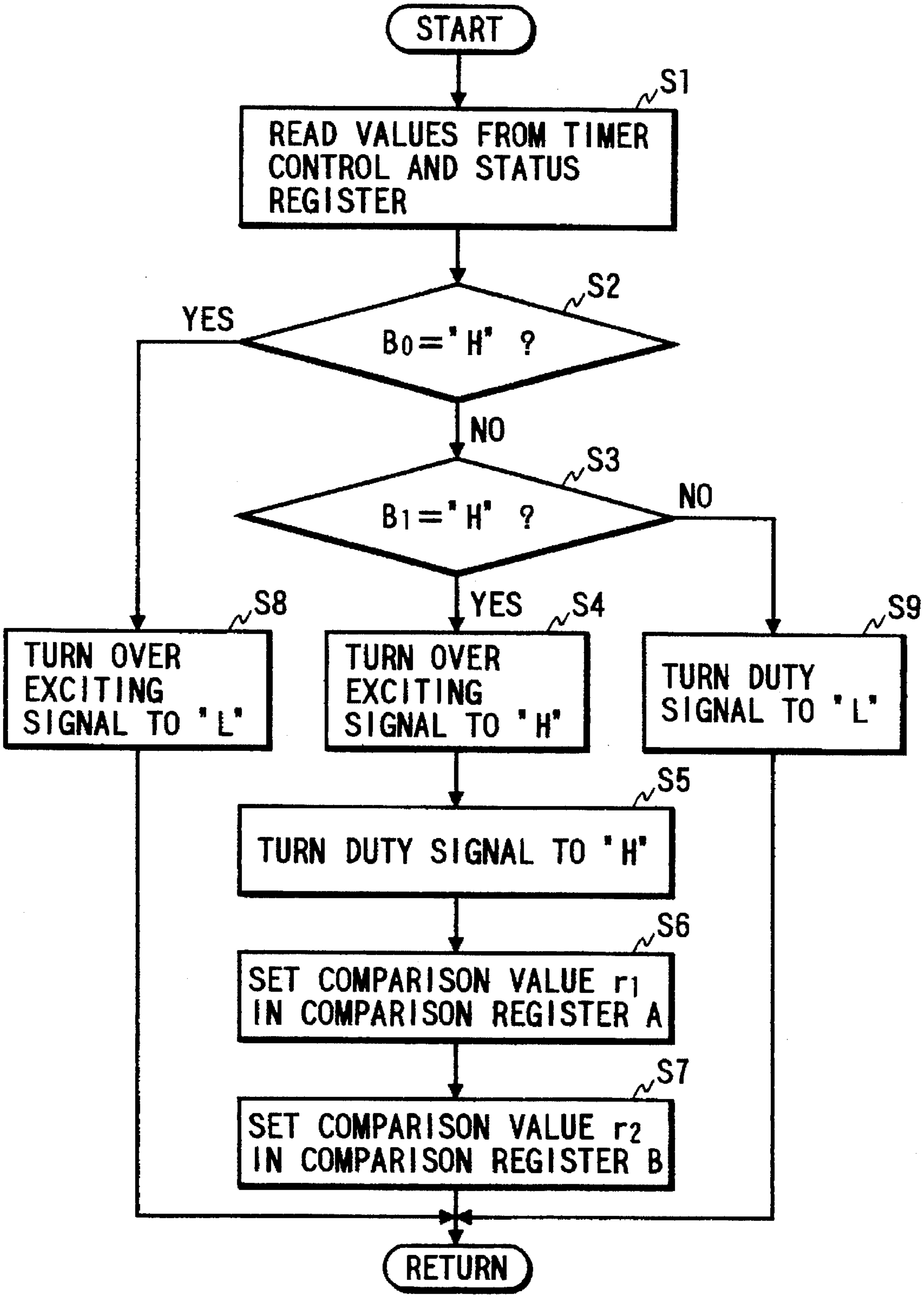
FIG. 4 is a flow chart showing the operation of the timer.
Figure 5:
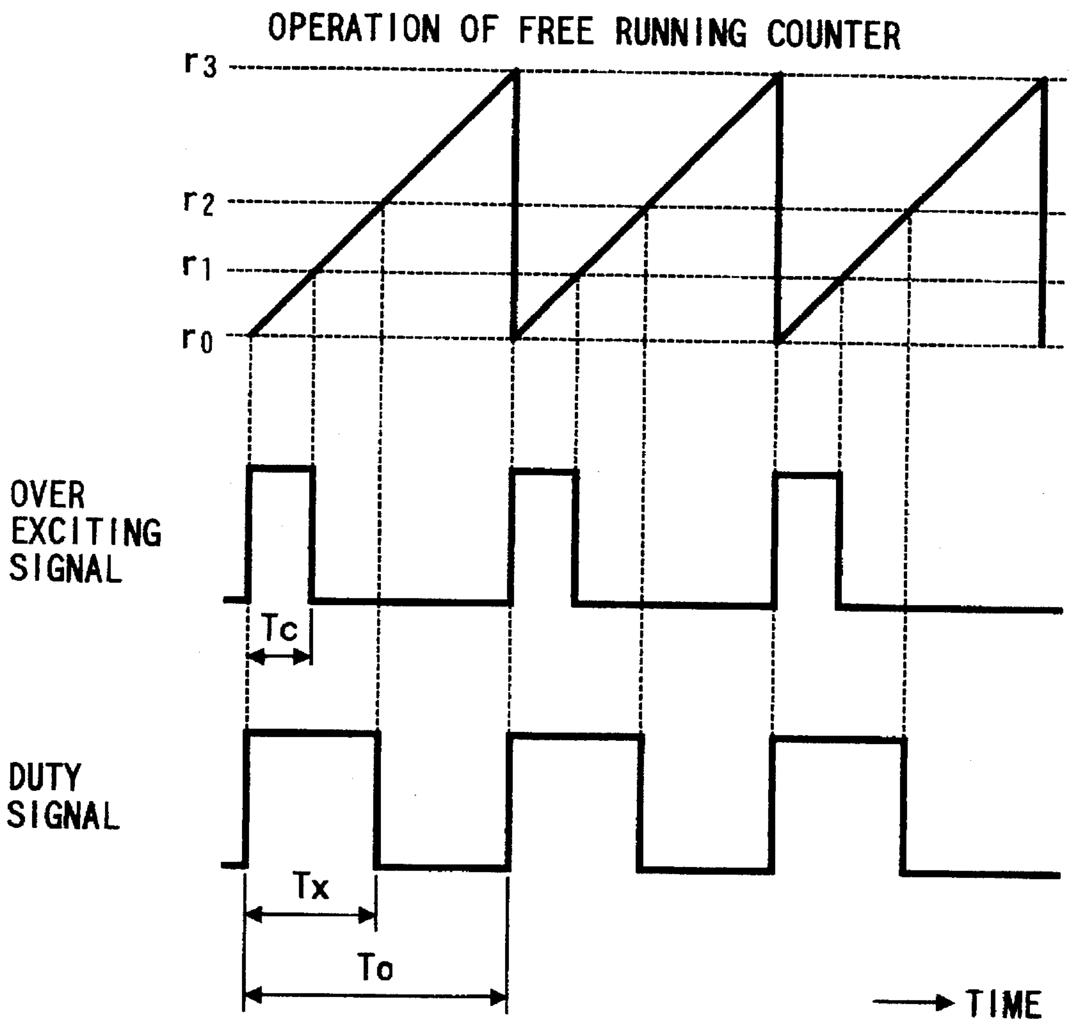
FIG. 5 is a time chart showing the operation of the timer.

FIG. 3 is a detailed block diagram of the timer 5. FIG. 4 is a flow chart showing the operation of the timer 5. FIG. 5 is a time chart showing the operation of the timer 5.

In FIG. 3, the reference numeral 51 designates a prescaler which receives a clock signal of the micro computer 100 as an input signal and divides the frequency of the clock signal by N. The reference numeral 52 designates a 16-bit free running counter for performing counting by using the output signal of the prescaler 51 as a clock signal. When the timer overflows, the free running counter 52 sets a timer overflow flag signal of H-level ("H" means high) in a bit B1 of a timer control and status register 57 (which will be described later). This timer overflow flag signal of H-level is a one-pulse signal, and its level is turned to "L" ("L" means low) soon.

The reference numeral 53 designates a 16-bit comparison register-A for setting a timer operating time corresponding to the period Tc of the overexcitation signal. The reference numeral 54 designates a 16-bit comparator-A for comparing the count value of the free running counter 52 and the set value of the comparison register-A 53 with each other. When the count value of the free running counter 52 exceeds the set value of the comparison register-A 53, the comparator-A 54 sets a compare flag signal of H-level in a bit B0 of the timer control and status register 57. This compare flag signal of H-level is a one-pulse signal, and its level is turned to "L" soon.

The reference numeral 55 designates a 16-bit comparison register-B for setting a timer operating time corresponding to the pulse duration Tx of the duty signal. The reference numeral 56 designates a 16-bit comparator-B for comparing the count value of the free running counter 52 and the set value of the comparison register-B 55 with each other. When the count value of the free running counter 52 exceeds the set value of the comparison register-B 55, the comparator-B 56 sets a compare flag signal of H-level in a bit B2 of the timer control and status register 57. This compare flag signal of H-level is a one-pulse signal, and its level is turned to "L" soon.

The reference numeral 57 designates an 8-bit timer control and status register for storing the comparison results obtained from the comparator-A 54 and the comparator-B 56, the timer overflow flag signal obtained from the free running counter 52 and the set value of the frequency dividing rate of the prescaler 51. The frequency dividing rate of the prescaler 51 is set by control flags of three bits B3 to B5. The reference numeral 58 designates an OR gate connected to the bits B0 to B2 of the timer control and status register 57. When any one of signals in the bits B0 to B2 is turned to "H", the OR gate 58 generates a program interruption signal to start the flow chart of FIG. 4.

Referring to FIGS. 3 through 5, the operation of the timer 5 will be described below.

When the count value of the free running counter 52 reaches the comparison value r3 in FIG. 5, the free running counter 52 clears the count value to r0 and at the same time gives the timer overflow flag signal of H-level to the bit B1 of the timer control and status register 57. The OR gate 58 generates an interruption signal in response to the timer overflow flag signal of H-level to start the flow chart of FIG. 4.

In step S1, values stored in the timer control and status register 57 are read. In this occasion, the bits B0, B1 and B2 have the following relations: B0="L", B1="H" and B2="L". Accordingly, the result of judgment in step S2 is "No" and the result of judgment in step S3 is "Yes", so that the situation of the routine goes to step S4. The overexcitation signal and the duty signal are turned to "H" in steps S4 and S5, respectively. In steps S6 and S7, comparison values r1 and r2 are set in the comparison register-A 53 and the comparison register-B 55, respectively. Thus, this routine is terminated.

The free running counter 52 performs counting on the basis of the output of the prescaler 51, so that the count value of the free running counter 52 becomes equal to the comparison value r1 soon. In this occasion, the comparator-A 64 sets a compare flag signal of H-level in the bit B0 of the timer control and status register 57, so that the OR gate 58 generates an interruption signal in response to the compare flag signal of H-level.

In the step S1, values stored in the timer control and status register 57 are read. In this occasion, the bits B0, B1 and B2 have the following relations: B0="H", B1="L" and B2="L". Accordingly, the result of judgment in the step S2 is "Yes", so that the situation of the routine goes to step S8. After the overexcitation signal is turned to "L" in the step S8, this routine is terminated.

The free running counter 52 performs counting continuously. When the count value of the free running counter 52 becomes equal to the comparison value r2, the comparator-B 56 sets a compare flag signal of H-level to the bit B2 of the timer control and status register 57. As a result, the OR gate 58 generates an interruption signal in response to the compare flag signal of H-level.

In the step S1, values stored in the timer control and status register 57 are read. Because the compare flag signal is a one-pulse signal as described above, the bits B0, B1 and B2 are "L", "L" and "H", respectively, in this occasion. Accordingly, the result of judgment in the step S2 is "No" and the result of judgment in the step S3 is "No", so that the situation of the routine goes to step S9. After the duty signal is turned to "L" in the step S9, this routine is terminated.

Thereafter, the free running counter 52 continues counting, so that the count value of the free running counter 52 becomes equal to the comparison value r3 soon. When the count value of the free running counter 52 reaches the comparison value r3, processing as described preliminarily is performed so that the aforementioned routine is repeated.

Incidentally, the comparison value r3 is timer operating time corresponding to the pulse repetition period To of the duty signal.

As described above, the duty signal and the overexcitation signal shown in FIG. 5 are generated. These signals are outputted from the output terminals OUT2 and OUT3, respectively, to the outside of the micro computer 100 through the data bus 7 and the input-output port 4.

Figure 2C:
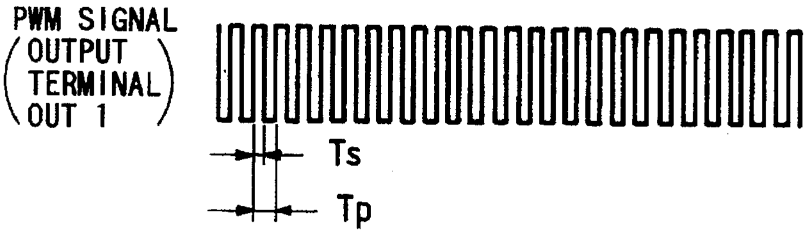

The PWM signal represented by FIG. 2C will be described below. FIG. 2C shows the waveform of a holding signal outputted from the output terminal OUT1. The holding signal is generated by the PWM timer 6. Incidentally, the PWM timer 6 constitutes a holding signal generating means.

Figure 6:
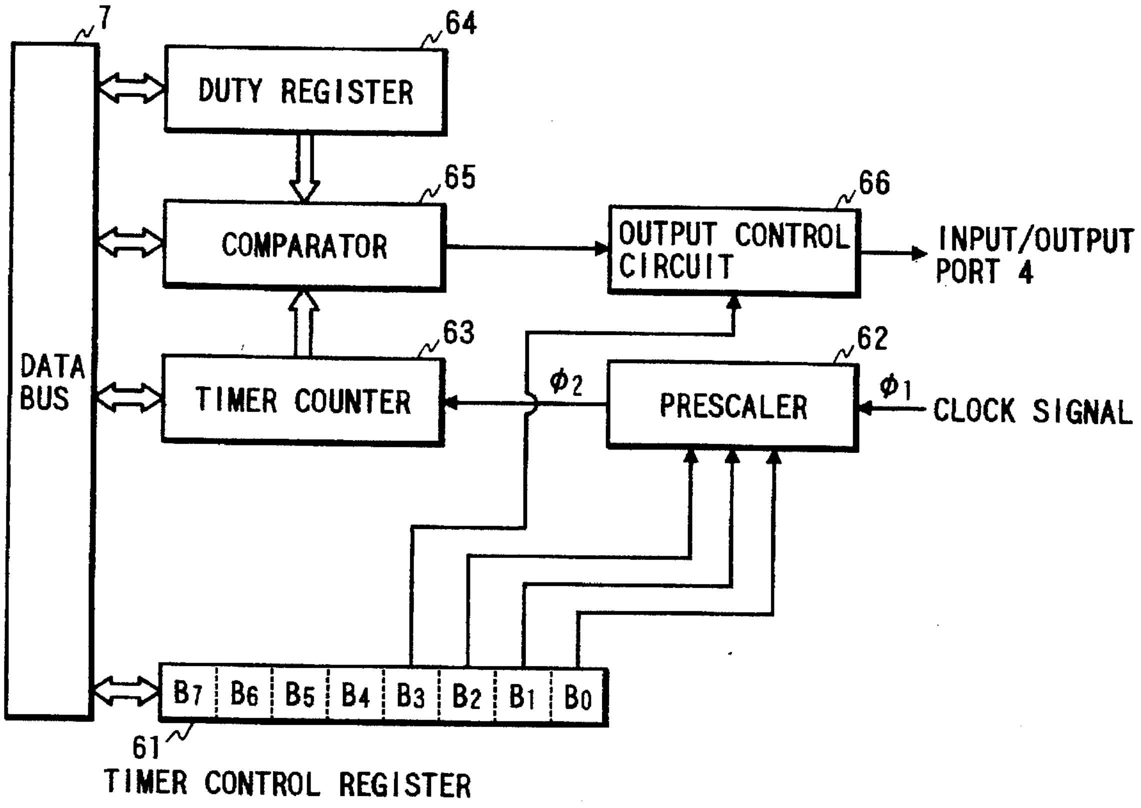
FIG. 6 is a detailed block diagram of the PWM timer in the apparatus depicted in FIG. 1.
Figure 7:
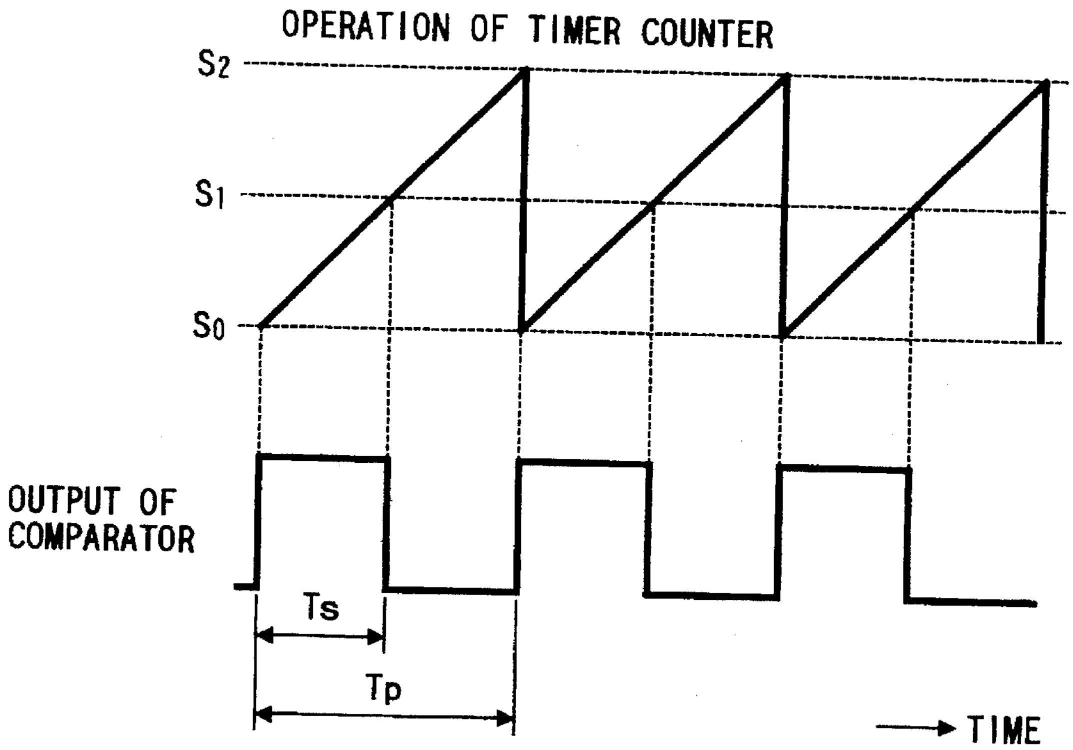
FIG. 7 is a time chart showing the operation of the PWM timer.

FIG. 6 is a detailed block diagram of the PWM timer 6. FIG. 7 is a time chart of the PWM timer 6. In FIG. 6, the reference numeral 61 designates an 8-bit timer control register for storing flags for controlling the PWM timer 6; 62, a prescaler for dividing the frequency of the clock signal of the micro computer 100 in a predetermined frequency-dividing rate on the basis of information of bits B0 to B2 of the timer control register 61; 63, an 8-bit timer counter for counting the output signal of the prescaler 62; 64, an 8-bit duty register for storing a comparison value S1 to determine the duty ratio of the PWM signal; 65, a comparator for comparing the count value of the timer counter 63 with the comparison value S1 of the duty register 64 to generate a signal of H-level when the count value of the timer counter 63 is not larger than the comparison value S1 of the duty register 64; and 66, an output control circuit for supplying the result of comparison of the comparator 65 to the input-output port 4 on the basis of the control flag of the bit B3 of the timer control register 61.

In FIG. 7, the timer counter 63 starts counting at a value S0, that is, "0". The timer counter 63 overflows at a value S2, that is, "255", and returns to S0. The timer counter 63 repeats this operation.

On the other hand, the duty register 64 stores a comparison value S1 which is 8-bit data as a duty ratio. When the count value of the timer counter 63 is less than the comparison value S1 of the duty register 64, the comparator 65 outputs a signal of H-level (pulse duration Ts). When the count value of the timer counter 63 is larger than the comparison value S1, the comparator 65 outputs a signal of L-level (remaining period Tp–Ts).

As a result, the output of the comparator 65 as shown in FIG. 7 is generated. Whether the thus generated output of the comparator 65 which forms a PWM signal is to be supplied to the input-output port 4 or not, is determined by the output control circuit 65 on the basis of the bit B3 of the timer control register 61.

Figure 8:
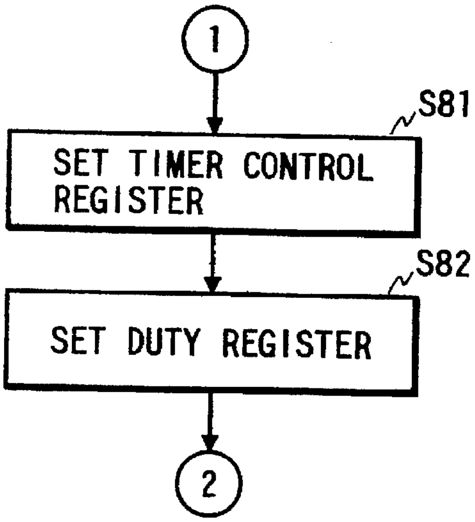
FIG. 8 is a flow chart showing a process for changing the operating state of the PWM timer.
Figures 9A, 9B, 9C, 9D:
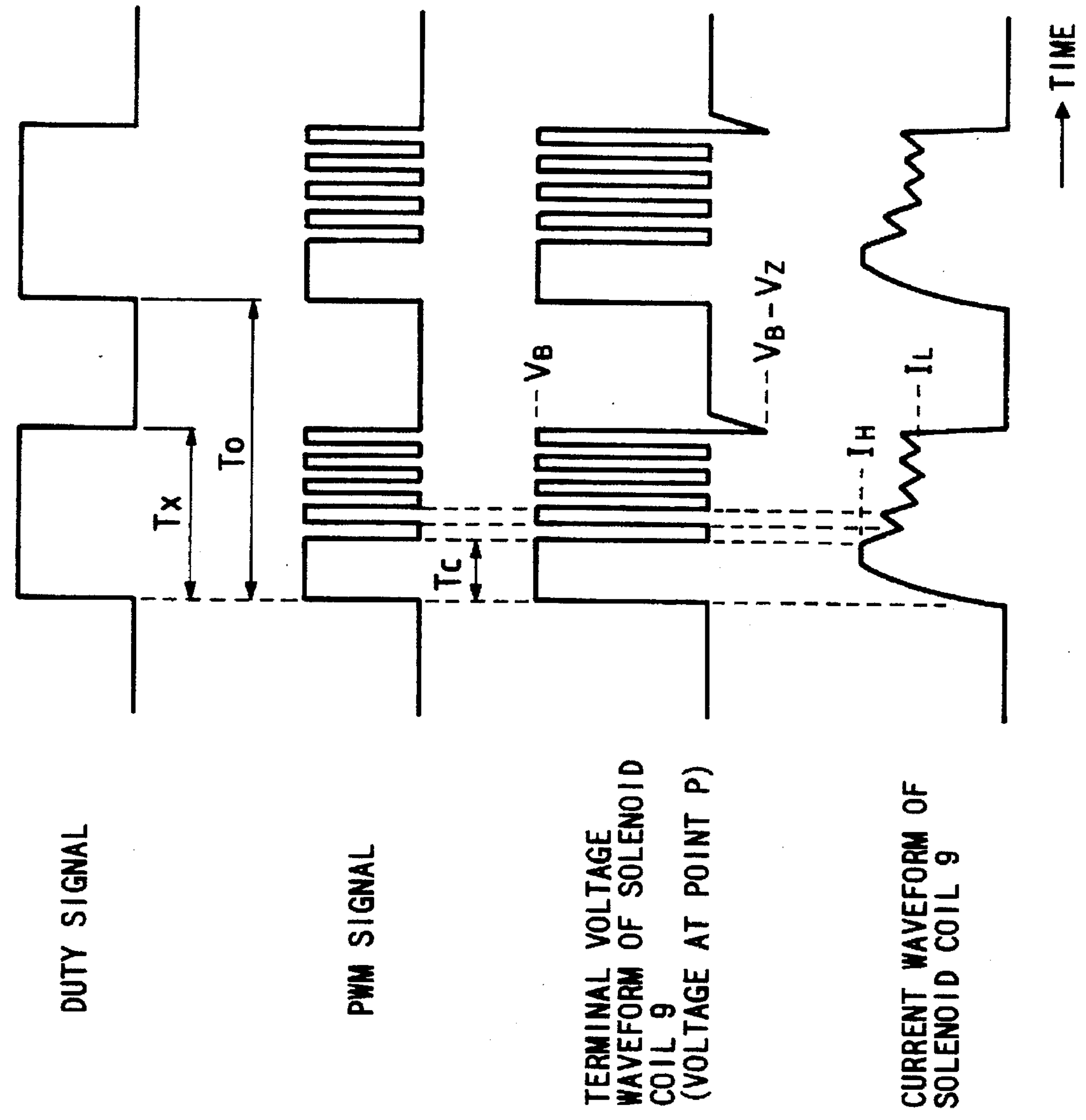
FIG. 9A PRIOR ART
FIG. 9B PRIOR ART
FIG. 9C PRIOR ART
FIG. 9D PRIOR ART
FIGS. 9A through 9D are time charts showing the operation of a conventional apparatus.

FIG. 8 shows a program for changing the operating state of the PWM timer 6.

In step S81, the timer control register 61 is set. This setting includes setting of the frequency-dividing rate of the prescaler 62, setting of data to be given to the output control circuit 66, and so on. In step S82, the comparison value S1 of the duty register 64 is set. If the comparison value S1 is set to be smaller, the duty ratio of the PWM signal becomes smaller, while if the comparison value S1 is set to be larger, the duty ratio of the PWM signal becomes larger.

In the case where the operating state of the PWM timer 6 is not changed, there is provided a hardware structure in which the operation shown in FIG. 7 is repeated automatically. In this case, the comparison value S1, the duration Ts and the period Tp are given as fixed values, so that a PWM signal having a predetermined duty ratio is outputted continuously.

The PWM signal generated as described above is outputted from the output terminal OUT1 to the outside of the micro computer 100 through the input-output port 4.

The thus generated output signal of the micro computer 100 is processed by a duty solenoid driving circuit 200 or 210, so that the processed signal is given to a solenoid coil 300 or 310.

In FIG. 1, the reference numeral 201 designates a field-effect transistor (FET) which supplies a current to the solenoid coil 300 when the FET 201 is made conductive; 202, a zener diode for protecting the FET 201; 203, another FET which is made conductive for a period during which the duty signal is "H"; 204, another zener diode for protecting the FET 203; 205, a further zener diode for clamping surge which is generated in the source of the FET 203 when the solenoid coil 300 is deenergized; 206 and 207, further zener diodes for making a circulating current flow in the solenoid coil 300; 208, a transistor for driving the FET 203; 209, an OR gate which is a logical sum calculating means; 210, an AND gate which is a logical product calculating means; 211 to 213, resistors; and 214, a diode. Incidentally, the OR gate 209 and the AND gate 210 constitute a signal synthesizing means.

The duty signal outputted from the output terminal OUT2 is supplied to the base of the transistor 208. The transistor 208 is made conductive in response to the duty signal of H-level. By the current conduction in the transistor 208, the FET 203 is made conductive. That is, the FET 203 is conductive in the period during the duty signal being "H".

The PWM signal outputted from the output terminal OUT1 and the overexcitation signal outputted from the output terminal OUT3 are supplied to input terminals, respectively, of the OR gate 209. The OR gate 209 calculates the logical sum of the two signals so that the OR gate 209 outputs a signal of H-level when either one of the two input signals is "H". The output signal of the OR gate 209 is given to one of input terminals of the AND gate 210 which is arranged posterior to the OR gate 209.

Figure 2D:
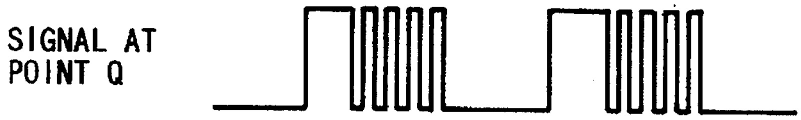

A signal outputted at the collector of the transistor 208 driven on the basis of the duty signal is supplied to the other input terminal of the AND gate 210. The AND gate 210 calculates the logical product of the signals supplied to the two input terminals thereof so that the AND gate 210 outputs a signal of H-level only when both the two input signals are "H". FIG. 2D shows the waveform of this signal (signal at point Q). This signal is supplied to the source of the FET 201 as a drive signal for driving the solenoid coil 300, so that the FET 201 is made conductive when this signal is "H".

Accordingly, the current conduction of the solenoid coil 300 is continued in a period during which the overexcitation signal is being inputted. When the holding signal is then supplied, the solenoid coil 300 is energized when the drive signal is "H" but it is deenergized when the drive signal is "L".

Further, when the drive signal is "L" in a duty period (in which the duty signal is "H"), the FET 203 is made conductive, so that a circulating current flows through the solenoid coil 300, the FET 203 and the diode 207 in order.

Figure 2E:
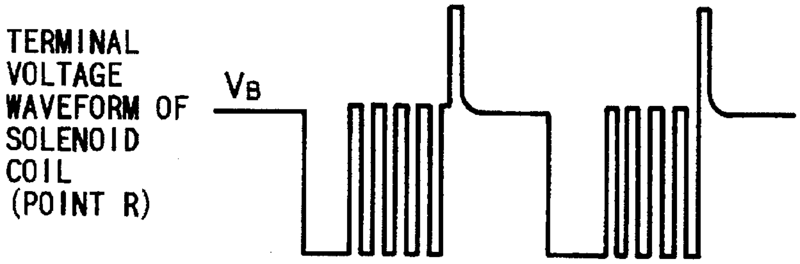
Figure 2F:
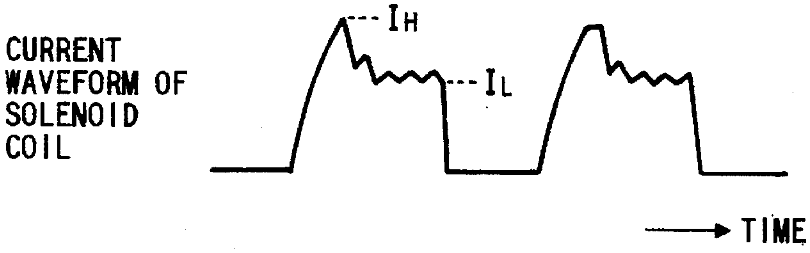

FIGS. 2E and 2F show the respective waveforms of the voltage between terminals of the solenoid coil and the current flowing in the solenoid coil.

Figure 10:
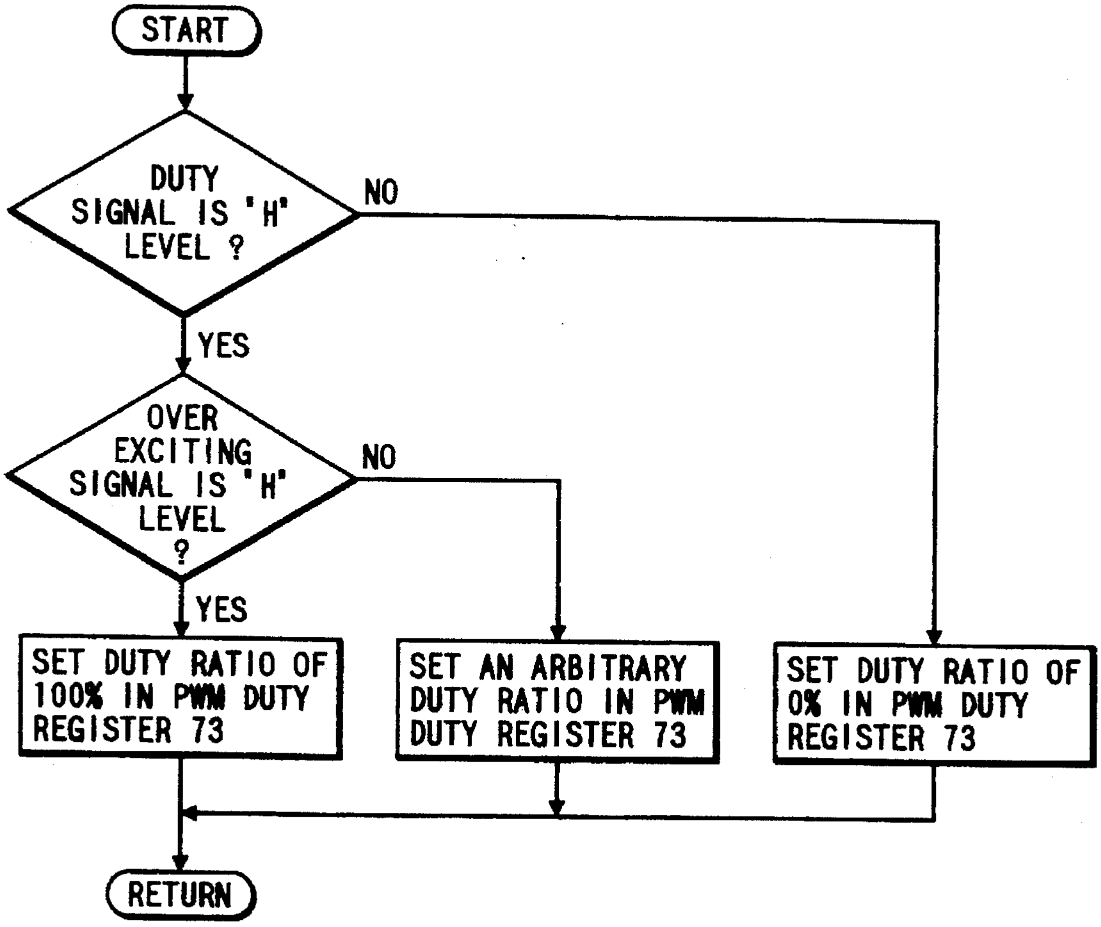
FIG. 10 PRIOR ART
FIG. 10 is a flow chart showing the operation of the conventional apparatus.

Accordingly, in the embodiment of the present invention, a process shown in FIG. 10 is not required, so that the load on the micro computer 100 can be lightened.

Further, because the logical sum and the logical product are obtained by the OR gate and AND gate, the calculation processing can be carried out in high speed.

Furthermore, a duty signal and an overexcitation signal corresponding to another duty solenoid valve are outputted from the output terminals OUT4 and OUT5, respectively, of the micro computer 100. These signals are processed by the duty solenoid valve driving circuit 210 to control the solenoid coil 310.

In addition, the PWM signal outputted from the output terminal OUT1 is also inputted to the duty solenoid driving circuit 210 so that this signal is used as a signal common to the respective duty solenoid driving circuits. Accordingly, the circuit structure can be simplified.

In the duty solenoid valve control apparatus according to the present invention, a drive signal is synthesized by a signal synthesizing means without executing an interruption process. Accordingly, not only the program capacity of the computer can be saved but also duty solenoid valves can be controlled at a high speed.

Further, a plurality of duty solenoid valves different in operation from each other can be controlled by a simple structure because a part of signals is used commonly to the plurality of duty solenoid valves.

Further, the plurality of duty solenoid valves different in operation from each other can be operated at a high speed because the signal synthesizing means is constituted not by a program but by the ORing or logical sum calculating means and the ANDing or logical product calculating means.

Further, in the duty solenoid valve control method according to the present invention, not only the program capacity of the computer can be lightened but also the duty solenoid valves can be controlled at a high speed.

What is claimed is:

1. A duty solenoid valve control apparatus, comprising:

a duty solenoid valve for controlling one of a pressure and flow rate of a fluid on the basis of a time ratio of a current conduction of a solenoid coil to a current non-conduction of said solenoid coil;

control means for controlling said duty solenoid valve, said control means including: a duty signal generating means for generating a duty signal corresponding to said time ratio; an overexcitation signal generating means for generating an overexcitation signal to overexcite said solenoid coil; and a holding signal generating means for generating a holding signal to hold said duty solenoid valve; and a driving means responsive to signals supplied from said control means for driving said solenoid coil; said driving means including a signal synthesizing means for synthesizing a drive signal for driving said solenoid coil on the basis of said duty signal, said overexcitation signal and said holding signal, said signal synthesizing means including a logical sum calculating means for calculating the logical sum of said overexcitation signal and said holding signal, and a logical product calculating means for calculating the logical product of said logical sum and said duty signal.

2. A duty solenoid valve control apparatus according to claim 1, comprising a plurality of duty solenoid valves, and a plurality of driving means, and wherein said control means commonly supplies said holding signal to each of said plurality of driving means thereby holding said plurality of duty solenoid valves.

3. A duty solenoid valve control apparatus according to claim 1, wherein said duty signal generating means has a first counter for counting a clock signal, a first register for setting a conduction time of the duty signal, and a first comparator for comparing the count value of said first counter and the set value of said first register;

wherein said overexcitation signal generating means has a second counter for counting a clock signal, a second register for setting an overexcitation time, and a second comparator for comparing the count value of said second counter and the set value of said second register; and wherein said holding signal generating means has a third counter for counting a clock signal, a third register for setting a duty ratio of said holding signal, and a third comparator for comparing the count value of said third counter and the set value of said third register.

4. In a duty solenoid valve control apparatus comprising a duty solenoid valve for controlling a pressure or flow rate of a fluid on the basis of a time ratio of a current conduction of a solenoid coil to a current non-conduction of said solenoid coil, a control means for controlling said duty solenoid valve, and a driving means responsive to signals from said control means for driving said solenoid coil, a method of controlling a duty solenoid valve comprising the steps of:

generating a duty signal corresponding to said time ratio;

generating an overexcitation signal to overexcite said solenoid coil;

generating a holding signal to hold said duty solenoid valve;

synthesizing said duty signal, said overexcitation signal and said holding signal into a drive signal for driving said solenoid coil by calculating the logical sum of said overexcitation signal and said holding signal and calculating the logical product of said logical sum and said duty signal; and driving said solenoid coil on the basis of said drive signal.

* * * * *